3,139,803
PHOTOGRAPHIC TYPE COMPOSITION
Richard C. O'Brien and Francis Hunstiger, Cleveland,
Ohio, assignors to Harris-Intertype Corporation, Cleveland, Ohio, a corporation of Delaware
Filed June 30, 1960, Ser. No. 40,071
7 Claims. (Cl. 95—4.5)

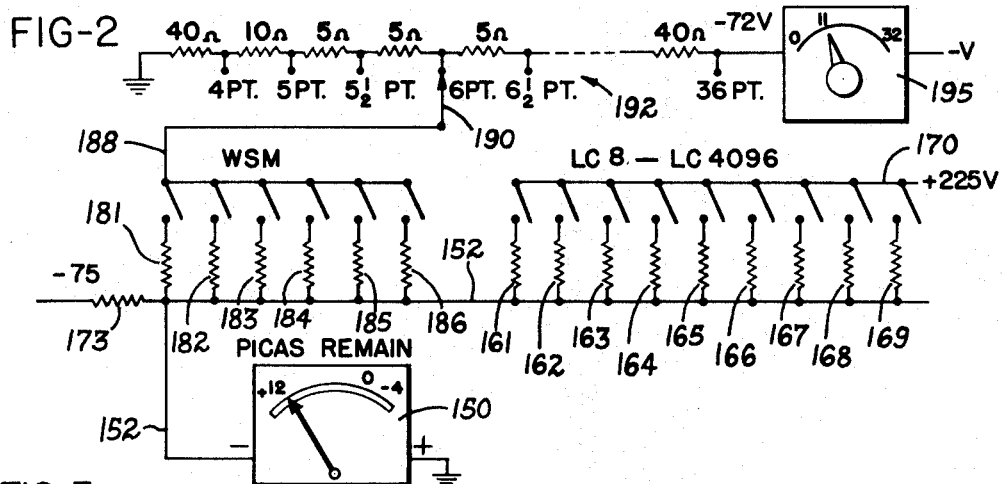
FIG-2
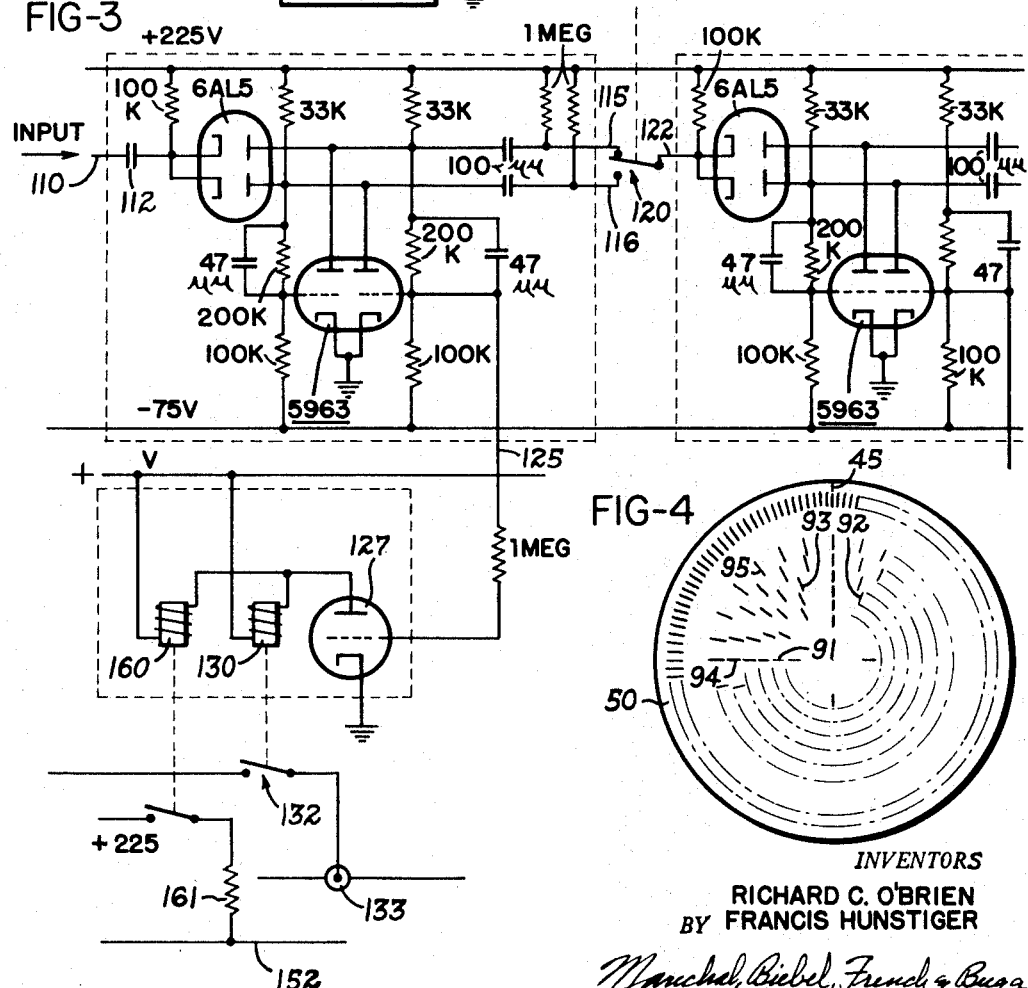
FIG-3
FIG-4
INVENTORS
RICHARD C. O'BRIEN
BY FRANCIS HUNSTIGER
ATTORNEYS

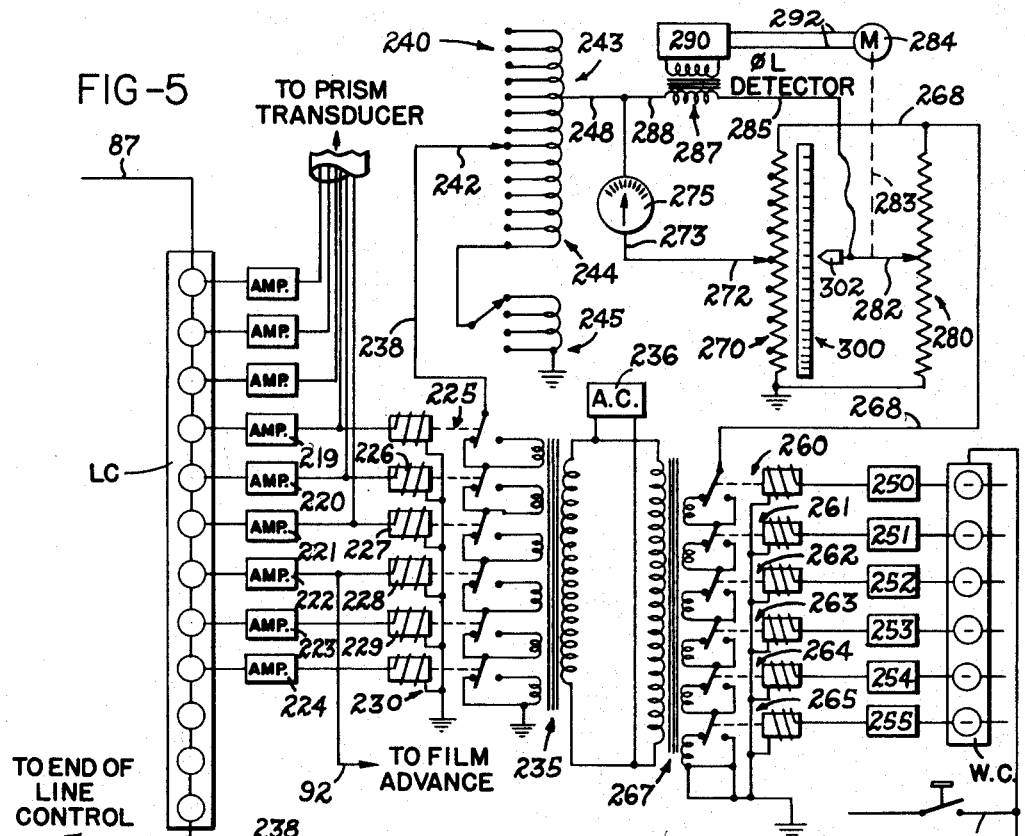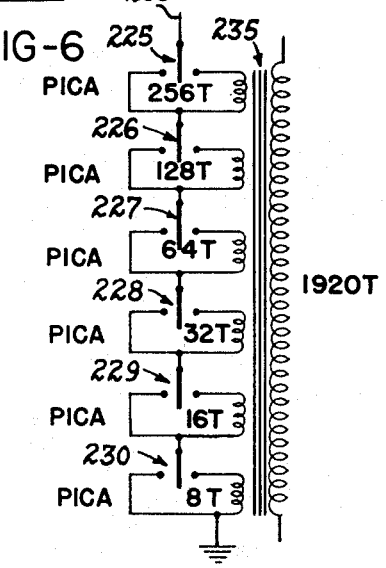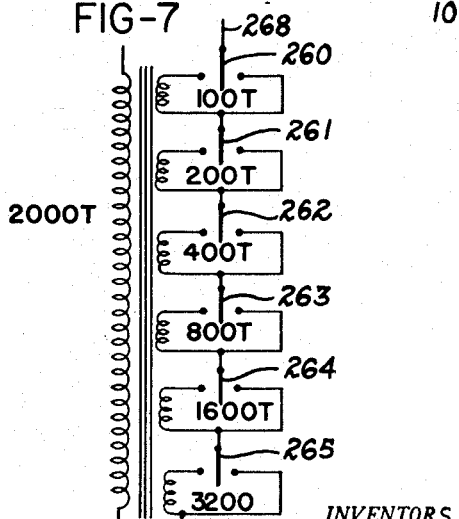

This application relates to photographic type composition, particularly to improved spacing apparatus for phototypesetting machines.

An important feature of this invention resides in the comparison of an analogue signal related to a desired spacing requirement, with another analogue signal related to the space used in a line of predetermined length. The invention contemplates the use of these signals to supply information and actuating signals for indications helpful to the composer in determining the space to be used up when justifying.

In supplying information related to justification the position signal is transformed into a complementary signal related to the actual space remaining in the line, and this complementary signal, either a varying current or varying voltage, is compared with a further corresponding signal which is an analogue of the number of word spaces in the line. The relation between these two signals thus provides a resultant which is an indication of the amount of space to be occupied by each word space to justify the line.

The primary object of this invention is, therefore to provide improved, simplified, and accurate spacing apparatus for phototypesetting machines by which the composer may be continuously informed of the spacing used, and the space remaining in a line to be divided among the spaces between words to produce a justified line of composition.

A further object of the invention is to provide for the composer apparatus by which he may observe the required expansion in word spaces to justify a line, while he is composing the line, and by which he may set into the apparatus different trial values of word spaces related to different point settings for determining whether the line may be justified properly with type of a given point set.

In the drawings:

FIG. 2 is a schematic diagram of a set indicator provided by this invention;

FIG. 3 is a diagram illustrating the manner in which the set indicator is controlled from the counters of the apparatus shown in FIG. 1;

FIG. 4 is a diagrammatic view of a suitable space computing disk used in the apparatus shown in FIG. 1;

FIG. 5 is a diagram of another embodiment of a set indicator; and

FIGS. 6 and 7 are schematic diagrams of components used in the set indicator of FIG. 5.

Figure 1:
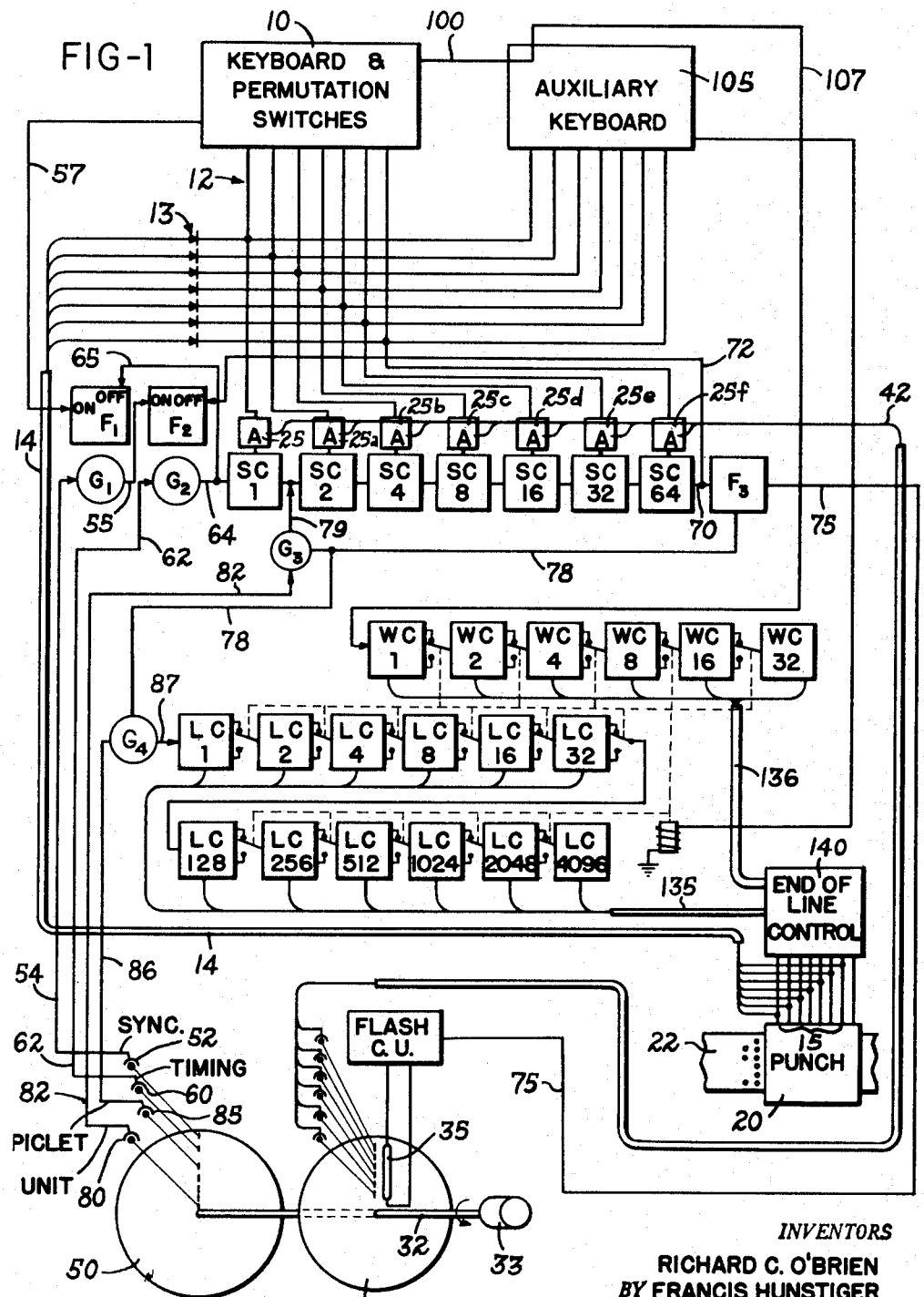
FIG. 1 is a schematic diagram of phototypesetting apparatus in accordance with the invention, particularly of the record preparing portion thereof which assembles and records information from which photographic apparatus is controlled.

The present invention is disclosed in combination with other features of phototypesetting apparatus which includes a first or keyboard machine, shown schematically in FIG. 1, and which is adapted to prepare a record tape of the lines of composition, and a second or photographic machine which operates under control of the prepared tape to produce an exposed galley film on which the lines of composition are formed as latent photographic images to be developed. The keyboard machine includes a main keyboard 10 which has a number of keys for selection of different characters, together with permutation switches which cooperate with the keys in known manner to produce a binary selection code in the form of electrical pulses or voltage applied to one or more of the seven selection output lines 12. These lines are connected through diode rectifiers 13 to the selector output lines 14, also seven in number, which lead to the first seven of eight input lines 15 controlling operation of a conventional coding and recording mechanism such as a punch unit 20 through which record tape, for example in the form of paper tape 22 to be perforated in a characteristic manner is supplied for producing a permanent record respective of each character selected by operation of the keyboard 10.

All of the characters which make up a font, including upper and lower case letters, numerals, punctuation, etc., should be alloted space in accordance with their relative widths. For example, the character "M" obviously requires considerably more width than the character "i." Furthermore, for versatility in machines of this type it is desirable to enlarge or reduce the characters in the photographic machine through a suitable optical system, and in such optical change allowance must be made for the variation in actual width occupied by the same characters at different enlargements. This may be conveniently accomplished by determining the relative or unit width of any selected character and multiplying this unit width by a point set factor which is a function of the enlargement produced by the optical system at that time, and whereby the product of unit width and the point set factor is representative of the actual width occupied by each selected character. In accordance with this invention the unit width measurements and point set factors are so selected that the actual width of each character is represented by a digital output defining the actual width of the selected characters in picas and fractions of a pica, hereafter referred to as piclets.

For the purpose of determining the relative or unit width of each selected character, and thence computing the actual space to be occupied by that character at a given point set, the keyboard code output lines 12 are connected respectively to seven buffer amplifier units 25, 25a, b, c, d, e, f, which in turn are connected to preset the individual stages SC1, SC2, SC4, SC8, SC16, SC32 and SC64 of a selector counter-space computer binary counter. These stages may conveniently be in the form of conventional Eccles-Jordan or similar flip-flop stages connected in cascade. This counter is designed to perform a dual function, namely first to select the unit space information pertaining to a selected character which is identified by the input code through the aforementioned buffer amplifiers, and secondly to cooperate with other apparatus in computing the actual space information for the selected character.

The unit space information is provided by a six digit binary code formed as differential light transmitting portions on a continuously rotating space code disk 30 which is fixed to a rotating shaft 32 driven by motor 33. The code is formed by having light transmitting slits (or inversely opaque marks) on the disk 30 in each of the six code positions, and the selected unit space information is picked up by causing flashing of a high speed flash lamp 35, under the control of a flash control unit 37 to energize appropriate ones of the six pickup photocells 40, each one of which is positioned in alignment with a respective code position. These photocells have six separate output lines 42 which extend to the buffer amplifiers 25a–f for presetting the corresponding stages SC2–SC64 of the counter in accordance with the selected space code.

Accordingly, when a character is selected by pressing a key on keyboard 10, the character selection code is set up in lines 12 and is transmitted through the rectifiers 13 and lines 14 to the punch input lines 15, for the purpose of actuating the punch to produce a characteristic punch code in the record tape 22 which identifies the character selected. At the same time the selection code is transmitted through the lines 12 to the buffer amplifiers 25, 25a–f, to preset the selector counter to the identification code number. The unit space code information on the rotating disk 30 is arranged in complementary fashion such that the unit space code for a selected character is spaced from a fixed point on the disk by a number of places which is, in the count of places, a complement of the selection code entered in the selector counter.

The fixed position, also referred to as the synchronizing position, is determined by a synchronizing light transmitting mark 45 on a timing and computing disk 50 (FIGS. 1 and 4) which is secured to shaft 32 in predetermined fixed position with respect to code disk 30, and cooperates with a photocell 52 and a light source (not shown) on the opposite side of disk 50 to produce a synchronizing pulse once for each revolution of the disks 30 and 50. This synchronizing pulse is transmitted through line 54 to a control gate circuit G1. This gate circuit is controlled by a flip-flop circuit F1 to follow the state thereof. Thus, when flip-flop F1 is in its first or "0" state G1 is "closed" or will not pass pulses transmitted thereto, and when F1 is in its "1" state, G1 is "open" and pulses transmitted through line 54 will be passed on through line 55 to a second control flip-flop F2. F1 is normally in its "0" state, closing gate G1, but will be switched to its "1" state by transmission of an initiate pulse through line 57 from keyboard 10. A pulse is transmitted through this line each time a character is selected, by depression of a key, or in some other suitable manner.

The timing disk 50 also is provided with pulse generating marks about its entire periphery in a radial zone separate from the synchronizing mark, and these timing marks cooperate with the aforementioned light source and a photocell 60 to generate timing pulses in line 62 which are transmitted to a further gate circuit G2 connected to follow flip-flop F2. Therefore, since F2 is normally in its "0" or "off" state, the gate G2 also will normally be "closed" and timing pulses will not pass through this circuit until F2 is caused to switch by receiving a pulse from line 55 through gate G1. However, when this occurs and F2 switches to its "1" state, G2 will "open" and pulses from line 62 will pass through G2 and its output line 64 to the input on stage SC1 of the selector counter at the same time, a reset pulse will pass on line 65 to flip-flop F1, causing it to revert to its normal "0" or "off" state and gate G1 will again close. Timing pulses will continue to pass through G2 into the selector counter until this counter fills up.

For example, assuming that the binary code for a selected character is 0010100 (corresponding to 20 in algebraic numbers), then in order to fill up the selector counter 107 more pulses must be received, at which time the counter will read 1111111. The next or 108th pulse will clear the selector counter and cause an output pulse at its output line 70 which is connected to the input of a flip-flop circuit F3, and at the same time a reset pulse will pass through line 72 to reset F2 to its "0" state, closing G2. F3 is connected through line 75 to control the operation of flash circuit 37, such that the flash control unit follows the state of F3. Therefore, F3 is normally in a state where the flash control unit is de-energized, but a pulse through the selector counter output 70 causes F3 to change its state and a pulse is transmitted through line 75 causing the flash control unit to produce an instantaneous flash of light from the flash lamp 35 as the space code information in the 108th position past the synchronizing or starting position is aligned with the photocell read-out bank 40.

The impulses generated by one or more of these photocells will be transmitted through the outputs 42 to preset the selector counter stages SC2–SC64, through the buffer amplifiers 25a–f, and these last six stages of the selector counter now function in cooperation with the computing disk 50 to compute the actual space to be occupied by the just selected character at a given point set.

The spacing computing operation proceeds as follows. When F3 was caused to change its state and actuate the flash control unit 37, this also produced a signal in line 78 causing the normally closed gate circuits G2 and G4 to open. The input to the selector counter is now through gate G3 and line 79 which receives impulses from the units photocell 80 which cooperates with units pulse generating marks on disk 50, there being for example one units mark for each quadrant, or four for each complete revolution of disk 50. The pulses generated by photocell 80 thus pass through line 82 to gate G3 and thence into stage SC2 of the selector, to accumulate therein and eventually to fill up the last six stages of this counter which have now been preset to a binary number representing the unit space width of the previously selected character, from the space code disk 30.

The input to gate G4 is from a piclets photocell 85 which transmits pulses through line 86 to gate G4, and when this gate is open to the input line 87 of the line length accumulator counter which comprises twelve binary stages identified as LC1–LC4096. The piclets input pulses to this counter each represent a discrete fraction of a pica, which is a standard printer's measurement equalling one-sixth of an inch.

There are a number of different characteristic radial zones from which the piclets photocell 85 may read selectively, as shown in FIG. 4. This selection is accomplished by moving the photocell 85 into alignment with a desired one of the radial zones of piclets impulses generating marks 91–95 such that a greater or less number of piclets impulses will be generated by this photocell between successive units impulses generated by the photocell 80.

As the units impulses are transmitted to and accumulated in the selector counter, this counter will begin to fill, and the number of units pulses required to fill the selector counter will be the complement of the unit space code preset into the counter from the photocell bank 40. Thus, when the last six stages of the selector counter are filled from the units input through gate G3, then the next units input pulse will transmit through line 70 to F3, causing this flip-flop to revert to its normal state and close the gate circuits G3 and G4. The total number of impulses transmitted through gate G4 to the line length accumulator counter during this interval will thus represent a digital input the sum of which is the total actual space to be occupied by the selected character, and this information is stored in the line length counter in this manner for each selected character, with subsequently received space information being added to that already stored in the counter to maintain a summation of the space in the line of composition to be occupied by the characters.

Similarly, every time there is an interword space in the line of composition the operator presses the space bar on the keyboard, closing a switch and transmitting a pulse through output line 100 which connects through the auxiliary keyboard 105 to the line 107 which transmits input pulses to the first stage of a word space counter comprising six cascade connected binary stages WC1, WC2, WC4, WC8, WC16 and WC32. Thus this counter maintains a summation of the number of word spaces in the line of composition.

For the purpose of reading the information in the line length accumulator counter and word space counter each stage of each of these counters is connected through a following amplifier to operate a relay. A typical arrangement of a binary stage with its following amplifier and relay, and showing also the reversing connection between successive cascade connected stages, is shown in FIG. 3. It should be understood that this arrangement is followed for all stages of the line length accumulator counter and the word space counter, with certain exceptions as will be noted.

Thus, referring to FIG. 3, the binary stage has an input connection 110 to an input condenser 112 connected to both cathodes of the input dual diode, which may be for example type 6AL5. The plates of the dual diodes are connected to the plates of a dual triode, for example type 5963, which is incorporated in a conventional Eccles-Jordan circuit as shown. These plate circuits are also connected through 100 mmf. Capacitors to the forward and reverse output contacts 115 and 116 for this stage, which may be alternately connected through the relay control switch 120 to transmit carry pulses to the input line 122 of the next stage. In the usual manner, one side or the other of the dual triode is conducting while the opposite side is cut off, and this condition reverses in response to each input pulse received at the input capacitor 112. Thus, the grids of the dual triode are alternately, and oppositely, at a slightly positive potential, and a following connection 125 is provided to the grid of a triode amplifier tube 127 which controls the fall of current through the coil of a relay 130. When triode 127 conducts relay 130 will be energized to close the contacts thereof and prepare a circuit through the contact 132 and a neon bulb 133 to a characteristic output line in the eight channel output matrix which controls operation of punch 20.

This circuit is not completed until the end of the line of composition is reached, and therefore the outputs are shown schematically from the line length accumulator counter and the word space counter, respectively, as output cables 135 and 136 (FIG. 1) which go to the end of line control 140. Therefore, although the relay 130 of each stage of these counters may be energized or deenergized several times during the composition of a line, only the final setting of these relays, after the lines has been completed, is utilized to complete the read out circuits which then cause coded information to be punched into tape 22 corresponding to the complement of the summation of space occupied by characters from the line length accumulator counter (i.e., the space remaining to be divided up for word spaces) and the direct reading of the number of word spaces in the line from the word space counter.

In order to give the compositor, who is operating the keyboard 10, an indication of the actual space remainder in the line, a set indicator circuit and read out is provided to determine and display the space remainder as the composition proceeds. Since the input to the line length accumulator counter is in terms of actual space occupied by the characters, an arbitrary unit width is enlarged according to the same point set factor which has been previously utilized in determining the actual space remainder.

The space remainder is represented by controlling the amount of electrical current flowing between ground, to which one side of the meter 150 (FIG. 2) is connected, and a control line 152 to which the other side of this meter is connected. In practice meter 150 may be a one Ma meter having a scale calibrated in picas remaining, to provide a direct reading of the excess space, in picas, which must be divided among the word spaces in a line. The last nine stages of line length counter, namely LC8–LC4096, also, in addition to the read out relays 130, are provided with set indicator relays 160 the contacts of which control connection of resistors 161–169 between the control line 152 and a +225 volt supply line 170.

Since the space remaining meter need not become operative until the end of a line of composition is near, a bias current is provided by connecting the control line 152 to a —75 volt supply through a biasing resistor 173. In a similar manner, the six stages of the word space counter are provided with set indicator relays (the same as relays 160) which control the connection of six resistors 181–186 to a line 188. This line is connected to the tap 190 of a point size selector potentiometer 192 having taps between resistors of predetermined values, for example the values denoted, and being connected on one side to ground and on the other side to a —72 volt variable voltage supply control 195 which is in turn connected to a suitable source of negative D.C. voltage. Adjustment of the variable supply 195 will increase or decrease the biasing voltage to a desired voltage which is proportionate to the unit value to be alloted to word spaces. In the illustrated example the —72 volts is the setting required for a word space of eleven units. The tap 190 is adjusted to the appropriate setting for the selected point size at the same time that the photocell 80 is adjusted to a given radial zone for the piclets photocell pickup.

The meter 150 is calibrated in such a fashion as to show how much actual space is left in a line that can be used for characters and word spaces. When the needle reaches the zero indicated, the line will be justified with word spaces equal to the setting shown on the variable voltage supply. At all times the meter 150 is under the influence of three separate currents: (1) the current through relay contacts in the word space memory in the direction indicated, (2) current through relay contacts in the space remaining memory in the direction indicated, and (3) a bias current in the direction indicated.

Following is a numerical example. With the variable voltage supply 195 set at a word space value of 11 units (approximately ⅓ em) and the point size selector set at 12 points, and assuming that there are 2 picas remaining in the space memory as indicated and that 6 words spaces have been used as indicated, the following situation will obtain. Since ⅓ of a 12 point em equals 4 points and there are 6 word spaces, there will be 24 points worth of current flowing through the meter in the direction indicated. Also, since 2 picas equal 24 points, there will be 24 points of current flowing through the meter in the opposite direction as indicated. Thus the current due to the word spaces just balances the current due to the space remaining, and if it were not for the bias current the meter would rest at its zero current position.

In the example cited, if the operators stops typing when the meter indicates zero the photographic machine will justify the line and provide word spaces approximating ⅓ em. If the operator desires his word spaces to be narrower than ⅓ em he can adjust the variable voltage supply to a smaller unit value of word space. This will diminish the current through the relay contacts in the word space memory and as a consequence cause the needle to move to the left, thus indicating that there is now more space available for more characters.

Since the space remaining is in picas and the word spaces are only accounted for as numbers, it is necessary to convert the word spaces into picas so that they may be subtracted from the picas remaining. This is accomplished by the string of resistors 192 indicated as the Point Size Selector. Thus all currents through the meter are directly proportional to the picas.

Another type of apparatus for indicating space remaining is shown in FIGS. 5, 6 and 7. In this apparatus variable voltages are provided as the analogue signals related to space occupied by characters and space remainder, as well as the amount of space to be occupied by interword spaces at a given point set.

In the modified form of apparatus, the fourth through the ninth stages of the line length counter are connected, through amplifiers 219–224, to control, individually, six single pole double throw relays 225–230. These relays control the tapped secondary winding of a transformer 235, the primary winding of which is connected to a suitable source 236 of constant A.C. voltage. As is apparent from the drawing, when one or more of the relays 225–230 is energized more or less of the secondary windings of transformer 235 are connected in the circuit between an output line 238 and ground.

Recalling that the line length counter LC is preset for a predetermined line length, and that as pulses are supplied to this counter they tend to fill the counter to its preset capacity, as the count approaches the capacity the complement of the count equals the space remaining in the line. In the illustrated example, as above described, the LC counter has a capacity of 64 picas in increments of 1/64th of a pica.

Therefore, as the LC counter fills up, toward the end of composition of a line, the last three stages of this counter are set to a count of one, and as the fourth through ninth stages of this counter fill up the compositor is within eight picas of the end of the line. Accordingly, as the relays 230, 229, and 228 are energized in that sequence the remainder of space in the line decrease in the order of the binary progression 4, 2, 1. Assuming for purposes of example that the spacing mechanism has reached a point where exactly eight picas of space remain between the present position of the spacing apparatus and the end of a line of predetermined length, then the next pulse reaching the fifth stage of the counter will result in a signal through amplifier 219 to shift, connecting the secondary winding under the control of that tap between ground and output line 238.

Referring to FIG. 3, if all of the relays 225–230 are at this time shifted to the right as in FIG. 5, each of the tap secondaries of transformer 235 is connected in series with the others so that the maximum possible induced voltages in the transformer secondary appears between line 238 and ground. Assuming for purposes of example that the primary of this transformer contains 1,920 turns, and that it is excited by a 120 volt A.C. source, then if the tap controlled by relay 225 has a total of eight turns, that controlled by relay 226 has sixteen turns, and the taps controlled by relays 227–230 having 32, 64, 128 and 256 turns respectively, as shown in FIG. 6, then at this time the potential of output line 238 will be 32 volts.

When the spacing apparatus moves another one-eighth pica the fifth or "LC 16" stage of the LC counter 88 will shift, shifting relay 225 to drop the eight turn secondary winding, and the output voltage in line 238 will then be 31 and one-half volts, indicating a space remaining in the line of 7⅞ picas. Continuing with the example, when the spacing apparatus moves an additional one-eighth pica the fifth stage of the counter will revert to its previous state, and the sixth or "LC 32" stage will flop or shift, causing relay 226 to drop out the sixteenth turn winding while relay 225 again reverts to connect the eighth turn winding back into the circuit. The output voltage will then be 31 volts indicating 7¾ picas remaining in the line.

It will be seen from the above example that as the LC counter fills up at the end of the line the voltage in output line 238 will drop in increments of one-half volt per one-eighth pica used.

Referring again to FIG. 5, and recalling that the magnitude of the voltage in line 238 is analogous to the total amount of space in picas remaining in the line, this output line leads to a multi-tapped autotransformer indicated generally at 240, and the output 238 is connected into this transformer through a variable input tap 242. It will be noted that transformer 240 is divided into two windings, the upper winding 243 having taps therein uniformly distributed at 128 turns per tap with the exception of the lowermost or first tap 244 which has 512 turns. The lower winding 245 is divided into three tap sections of 32 turns per tap or a total of 96 turns. Thus, the range of autotransformer 240 may be from four-point to sixteen-point type. The highest voltage obtainable in the secondary of transformer 240 is 144 volts, and therefore, if the maximum 32 volts from transformer 235 and line 238, representing eight picas, were impressed on the four point tap of transformer 240, 144 volts would appear at the secondary output line 248, representing twenty-four ems at four points or approximately six volts per em. The voltage at output 248, is, therefore, indicative of the number of ems left in the line that have not been used.

Referring to the other side of FIG. 5, the word space memory counter WC has each of its six stages connected through amplifiers 250–255 to control a set of six relays 260–265, and these relays control the tapped secondary of a further transformer 267, the primary of which is connected to the 120 volt A.C. source 236. Assuming that the primary winding of transformer 267 has two thousand turns, and that the secondary winding associated with relay 260 has one hundred turns, when this secondary winding only is connected between ground and the output line 268, the potential of this line will be six volts, and thus for one word space pulse directed to the WC counter there will be a six volt signal in output line 268, and if the taps controlled by relays 261–265 contain 200, 400, 800, 1600, and 3200 turns respectively, then the voltage signal in output line 268 will vary in magnitude according to the number of word spaces.

It will be noted that the ratio of outputs in both lines 248 and 268 is six volts per em. Therefore, if transformer 265 is arranged as shown the maximum potential of line 268 will be 378 volts, and at six volts per em this gives a capacity of sixty-three ems. This output is impressed across a tapped high impedance potentiometer 270 having uniform resistance between taps. Assuming for purposes of explanation that each word space occupies one-third of an em (this is usually the case), then if the tap 272 is so adjusted that the potential at the tap is one-third the value of the potential across potentiometer 270, the potential in line 273 will be of a magnitude corresponding to the number of word spaces in the line and the space occupied by those word spaces.

A high impedance (30 megohms for example) volt meter 275 is connected between lines 248 and 273, and the potential difference between them, indicated on the meter, is indicative of the number of ems remaining in the line that have not been used for characters. By observing meter 275 the compositor may observe the amount of space which must be divided among the word spaces in the line in order to justify the line. This information is especially useful to the compositor when he nears the end of the line and would like to determine whether there is room enough left in the line, for example, for an additional small word. Of course, when the indicator on meter 275 is at zero, indicating no potential difference between lines 248 and 273, then the line being composed is indicated as full to its capacity. This zero setting may be used during composition of a line as follows.

A further voltage divider 280 such as a slide wire potentiometer, is connected between lines 248 and 268, and the tap 282 for this potentiometer is driven, as indicated schematically at 283, by a reversible motor 284. The line 285 leading from tap 282 is connected to the primary winding of a transformer 287, and the other end of this winding is connected through line 288 to the line 248 from autotransformer 240. The secondary winding of transformer 287 is connected to a conventional zero and phase detecting circuit shown schematically at 290, and this circuit, through lines 292, controls motor 284. The arrangement is such that so long as there is a potential difference impressed upon circuit 290 by transformer 287 then motor 284 is rotated to drive the tap 282 in a direction to null this potential difference.

The sliding tap 288 therefore follows the composition of the line and will provide a visible indication on a scale 300 by movement of an indicator 302 therealong. The indicator may be suitably mounted upon the sliding tap 288, as shown schematically in FIG. 5, to provide the visible output signal or indication as composition of a line proceeds.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A justification indicator for typesetting apparatus comprising, means providing a first input signal related in magnitude to the total actual space used by characters during composition of a line of predetermined space length, means providing a second input signal related in magnitude to the total number of word spaces in the line multiplied by an arbitrary actual word space value, means representing the total available space in the line, means comparing the total of said first and second input signals with the total space means to determine the adjustment of the width of each word space required to justify the line, and means for adjusting the magnitude of said second input to correspond to the product of the number of word spaces and different trial values of word spaces for determining when the line may be justified properly.

2. A set indicator for typesetting apparatus comprising means for selecting and recording a representation of individual variable width characters and interword spaces in predetermined sequence to form a line of composition of predetermined length, means connected to said selecting means for maintaining a cumulative total of space in the line occupied by characters as composition of the line progresses, means for totaling separately the number of interword spaces used during composition of the line, first signal means driven by said character space totaling means producing an output signal representing the total space occupied by characters used, second signal means driven by said interword space totaling means to produce a space representing signal using an arbitrarily chosen spacing for each interword space, output means connected to both said signal means to produce an output signal representing all space used in composing the line, and comparing means receiving said output signal and producing a visual representation of all space used in comparison to the space available for composition to determine the magnitude of the space remainder which is to be distributed among the interword spaces in producing a justified line.

3. A set indicator for typesetting apparatus comprising means for selecting and recording a representation of individual variable width characters and interword spaces in predetermined sequence to form a line of composition of predetermined length, means connected to said selecting means for maintaining a cumulative total of space in the line occupied by characters as composition of the line progresses, means for totaling separately the number of interword spaces used during composition of the line, first signal means driven by said character space totaling means producing an output signal representing the total space occupied by characters used, second signal means driven by said interword space totaling means to produce a space representing signal using an arbitrarily chosen spacing for each interword space, output means connected to both said signal means to produce an output signal representing all space used in composing the line, comparing means receiving said output signal and producing a visual representation of all space used in comparison to the space available for composition to determine the magnitude of the space remainder which is to be distributed among the interword spaces in producing a justified line, and means connected to said second signal means for selectively changing the arbitrarily chosen spacing alloted to each interword space.

4. A set indicator for typesetting apparatus comprising means for selecting and recording a representation of individual variable width characters and interword spaces in predetermined sequence to form a line of composition of predetermined length, means connected to said selecting means for maintaining a cumulative total of space in the line occupied by characters as composition of the line progresses, means for totaling separately the number of interword spaces used during composition of the line, first signal means driven by said character space totaling means producing an output signal representing the total space occupied by characters used, second signal means driven by said interword space totaling means to produce a space representing signal using an arbitrarily chosen spacing for each interword space, output means connected to both said signal means to produce an output signal representing all space used in composing the line, comparing means receiving said output signal and producing a visual representation of all space used in comparison to the space available for composition to determine the magnitude of the space remainder which is to be distributed among the interword spaces in producing a justified line, and means connected into said selecting and recording means for recording at the end of composition of the line a representation of all space in the line not occupied by characters and a representation of the number of interword spaces in the line.

5. In phototypesetting apparatus, the combination of character selector means including a keyboard and code producing means operated by said keyboard to form a code representation of each character selected by actuation of individual keys on said keyboard, means connected to said character selector means for reproducing each character representing code on permanent record material in the sequence of selection, a space computer having a selectively variable point size control and a means for producing a relative width representation for any selected character, an operating connection between said character selector means and said space computer to initiate operation of the computer and determine the actual space alloted to each selected character at the selected point size immediately upon selection of a character at the keyboard, a space accumulator counter receiving and totaling the space information determined by said computer to maintain a total representation of space alloted to characters during composition of a line, an interword space counter totaling the number of spaces inserted between words during composition of a line, a set indicator including a meter arranged to show the decline of space remaining as the composer approaches the end of a line, means responsive to the instantaneous total established in said accumulator counter providing a first signal representing all space alloted to characters in a line, means establishing an arbitrary selectively variable space value for each interword space, means responsive to the instantaneous total in said interword space counter and to said arbitrary space value providing a second signal representing an approximation of the space in the line to be used for word spaces, and means communicating said first and second signals to said set indicator for showing the continuing decrease in the space remainder to be divided among the word spaces for justifying the line.

6. In phototypesetting apparatus, the combination of control record producing means including a selectively operable device for placing code information on record material such as paper tape to form a composition photography control, character selector means including a keyboard and code producing means operated by said keyboard to form a code representation of each character selected by actuation of individual keys on said keyboard, a connection between said selector means and said record producing means to reproduce each character code on the record material, a space computer having a selectively variable point size control and a means for producing a relative width representation for any selected character, an operating connection between said character selector means and said space computed to initiate operation of the computer and determine the actual space allotted to each selected character at the selected point size prior to selection of a following character, a space accumulator counter receiving and totaling the space information determined by said computer to maintain during composition of a line a total representation of space allotted to characters, an interword space counter totaling the number of spaces inserted between words during composition of a line, a set indicator including visible means arranged to show the decline of space remaining as the composer approaches the end of a line, means responsive to the instantaneous total established in said accumulator counter providing a first signal representing all space allotted to characters in a line, means establishing an arbitrary selectively variable space value for each interword space, means responsive to the instantaneous total in said interword space counter and to said arbitrary space value providing a second signal representing an approximation of the space in the line to be used for word spaces, and means communicating said first and second signals to said set indicator for determining the space remainder to be divided among the word spaces in justifying the line.

7. In phototypesetting apparatus, the combination of control record producing means including a selectively operable device for placing code information on record material such as paper tape to form a composition photography control, character selector means including a keyboard and code producing means operated by said keyboard to form a code representation of each character selected by actuation of individual keys on said keyboard, a connection between said selector means and said record producing means to reproduce each character code on the record material, a space computer having a selectively variable point size control and a means for producing a relative width representation for any selected character, an operating connection between said character selector means and said space computer to initiate operation of the computer and determine the actual space allotted to each selected character at the selected point size prior to selection of a following character, a space accumulator counter receiving and totaling the space information determined by said computer to maintain during composition of a line a total representation of space allotted to characters, an interword space counter totaling the number of spaces inserted between words during composition of a line, a set indicator including visible means arranged to show the decline of space remaining as the composer approaches the end of a line, means responsive to the instantaneous total established in said accumulator counter providing a first signal representing all space allotted to characters in a line, means establishing an arbitrary selectively variable space value for each interword space, means responsive to the instantaneous total in said interword space counter and to said arbitrary space value providing a second signal representing an approximation of the space in the line to be used for word spaces, means communicating said first and second signals to said set indicator for determining the space remainder to be divided among the word spaces in justifying the line, and means operated from said accumulator counter and said interword space counter and connected to said record producing means to reproduce on the record material at the end of composing a line a coded representation of the space not occupied by characters and the number of interword spaces.

References Cited in the file of this patent

UNITED STATES PATENTS

| | | |
|---|---|---|
| 342,364 | Kimberly | May 25, 1886 |
| 608,002 | McLintock | July 26, 1898 |
| 2,540,027 | Dodge | Jan. 30, 1951 |
| 2,682,814 | Higonnet | July 6, 1954 |
| 2,847,919 | Rossetto | Aug. 19, 1958 |
| 2,876,687 | Higonnet | Mar. 10, 1959 |